(12) United States Patent
Amano

(10) Patent No.: US 8,868,278 B2
(45) Date of Patent: Oct. 21, 2014

(54) CONTROL DEVICE AND CONTROL METHOD FOR HYBRID VEHICLE

(75) Inventor: Takashi Amano, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/989,545

(22) PCT Filed: Nov. 25, 2010

(86) PCT No.: PCT/JP2010/070975
§ 371 (c)(1),
(2), (4) Date: May 24, 2013

(87) PCT Pub. No.: WO2012/070133
PCT Pub. Date: May 31, 2012

(65) Prior Publication Data
US 2013/0253747 A1 Sep. 26, 2013

(51) Int. Cl.
*F02D 1/00* (2006.01)
*F02D 41/00* (2006.01)
*B60K 6/445* (2007.10)
*B60W 20/00* (2006.01)
*B60W 30/188* (2012.01)
*B60W 10/06* (2006.01)
*B60W 10/08* (2006.01)

(52) U.S. Cl.
CPC ..... *B60W 20/1082* (2013.01); *B60W 2710/086* (2013.01); *Y10S 903/93* (2013.01); *B60W 2510/068* (2013.01); *B60W 2710/105* (2013.01); *Y02T 10/6239* (2013.01); *B60K 6/445* (2013.01); *B60W 2510/0657* (2013.01); *Y02T 10/6286* (2013.01); *B60W 30/1882* (2013.01); *B60W 20/00* (2013.01); *B60W 2600/00* (2013.01); *B60W 2510/244* (2013.01); *B60W 10/06* (2013.01); *B60W 2710/0622* (2013.01); *B60W 10/08* (2013.01); *B60W 2510/0638* (2013.01); *B60W 2510/0619* (2013.01)
USPC .............................................. 701/22; 903/930

(58) Field of Classification Search
CPC ... B60W 10/06; B60W 20/00; F02D 41/2467; F02D 41/40
USPC .................... 701/22, 101, 103, 104; 903/905; 123/319, 339.12, 344, 704
See application file for complete search history.

(56) References Cited

U.S. PATENT DOCUMENTS

| | | | |
|---|---|---|---|
| 5,570,575 A | 11/1996 | Sato et al. | |
| 8,380,376 B2 * | 2/2013 | Akimoto | ........................ 701/22 |
| 2005/0103544 A1 | 5/2005 | Takami et al. | |
| 2008/0256929 A1 * | 10/2008 | Sugimoto | ...................... 60/278 |

FOREIGN PATENT DOCUMENTS

| | | |
|---|---|---|
| JP | 7-103031 A | 4/1995 |
| JP | 8-303234 A | 11/1996 |

(Continued)

*Primary Examiner* — Mary Cheung
(74) *Attorney, Agent, or Firm* — Kenyon & Kenyon LLP

(57) ABSTRACT

A hybrid vehicle includes an engine and a motor each for generating vehicle driving power. An operation region indicated by rotational speed and torque of the engine includes: an normal region in which a fuel injection amount is calculated in accordance with a stoichiometric air-fuel ratio; and an amount increase region in which an amount of fuel is increased compared with the normal position so as to suppress temperature increase of a catalyst. A control device calculates a total required power of the vehicle depending on the vehicle state, and determines an engine operation point in accordance with the total required power. When the engine operation point is in the OT amount increase region, the engine operation point is changed to fall within the normal region by decreasing the engine output power. An output power of the motor is determined to compensate the decrease of the engine output power and secure the total required power.

12 Claims, 13 Drawing Sheets

(56) References Cited

FOREIGN PATENT DOCUMENTS

| | | |
|---|---|---|
| JP | 2004-204707 A | 7/2004 |
| JP | 2005-083300 A | 3/2005 |
| JP | 2005-096574 A | 4/2005 |
| JP | 2007-237794 A | 9/2007 |
| JP | 2009-214704 A | 9/2009 |
| JP | 2010-179805 A | 8/2010 |

* cited by examiner

CONTROL DEVICE AND CONTROL METHOD FOR HYBRID VEHICLE

This is a 371 national phase application of PCT/JP2010/070975 filed 25 Nov. 2010, the contents of which are incorporated herein by reference.

TECHNICAL FIELD

The present invention relates to a control device and a control method for a hybrid vehicle, more particularly, suppression of exhaust emission from an internal combustion engine of the hybrid vehicle.

BACKGROUND ART

A hybrid vehicle, which includes an engine and a motor as a driving power source, can achieve zero emission traveling by traveling only using the motor with the engine being stopped. Meanwhile, generally, at least during high-speed traveling or acceleration in which driving power becomes large, the hybrid vehicle travels with the engine being operated. Hence, in order to remove emission from the exhaust gas of the engine, an exhaust emission purifier such as a three-way catalyst is provided. In the description below, such exhaust emission purifiers are also collectively and simply referred to as "catalyst".

Japanese Patent Laying-Open No. 2007-237794 (PTL 1) describes a technique for decreasing temperature of a catalyst when the temperature of the catalyst becomes excessively high. Specifically, it is described that when the level of state of charge (SOC) in the battery is high, the motor is controlled to increase motor output so as to rotate the engine at a predetermined rotational speed or more using the motor output, and that when the level of the SOC is low, the air-fuel ratio of the engine is enriched and engine output is increased to get out of a low-load region.

Further, Japanese Patent Laying-Open No. 2004-204707 (PTL 2) describes engine control for avoiding occurrence of knocking in a hybrid vehicle. Specifically, when operating state of the engine is transitioned from an initial state to a final state in response to a request for high-load output, the engine is temporarily controlled to operate in a transient state, which is an intermediate state between the initial state and the final state. While operating in the transient state, the motor generator operates to compensate insufficiency of the engine output.

CITATION LIST

Patent Literature

PTL 1: Japanese Patent Laying-Open No. 2007-237794
PTL 2: Japanese Patent Laying-Open No. 2004-204707

SUMMARY OF INVENTION

Technical Problem

By enriching the air-fuel ratio of the engine as described in PTL 1, the temperature of the exhaust gas of the engine can be decreased, thereby suppressing temperature increase of the catalyst. Hence, in order to suppress temperature increase of the catalyst in the high output region of the engine, it is known to increase an amount of fuel (hereinafter, also referred to as "OT amount increase") so as to render the air-fuel ratio richer than the stoichiometric air-fuel ratio.

However, when the increase in amount of fuel causes decrease of the air-fuel ratio to fall below the stoichiometric air-fuel ratio, unburned CO is generated. Accordingly, even when the catalyst is activated, exhaust emission may be increased. In particular, in recent years, regulations on emission are becoming severer. In order to satisfy requirements of such regulations on emission, the increase in amount of fuel may not be permitted to be applied.

The present invention has been made to solve such a problem, and has its object to suppress exhaust emission of a hybrid vehicle without causing insufficiency of vehicle driving power and exhaust emission purifier's (catalyst's) excessively high temperature resulting from increase of temperature of exhaust gas.

Solution to Problem

In a certain aspect of the present invention, in a control device for a hybrid vehicle including an internal combustion engine and a motor each for generating vehicle driving power, an operation region indicated by rotational speed and torque of the internal combustion engine includes a first operation region in which a fuel injection amount is calculated in accordance with a stoichiometric air-fuel ratio, and a second operation region in which an amount of fuel is increased to exceed the fuel injection amount that is in accordance with the stoichiometric air-fuel ratio so as to suppress temperature increase of a catalyst provided in an exhausting system of the internal combustion engine. The control device calculates a total required power of the hybrid vehicle in accordance with a vehicle state, determines an output power of the internal combustion engine such that the torque and the rotational speed of the internal combustion engine are included in the first operation region in all vehicle states, and determines an output power of the motor based on the output power of the internal combustion engine so as to secure the total required power.

Preferably, the hybrid vehicle further includes a starter motor for motoring the internal combustion engine when starting the internal combustion engine. When starting the internal combustion engine, the control device sets the fuel injection amount of the internal combustion engine in accordance with the stoichiometric air-fuel ratio, and controls the starter motor to generate positive torque for the motoring during a period of time until the rotational speed of the internal combustion engine reaches a target rotational speed upon the starting. Alternatively, when starting the internal combustion engine, the control device sets the fuel injection amount of the internal combustion engine in accordance with the stoichiometric air-fuel ratio, and controls the starter motor to settle a rotational speed of the starter motor at a steady-state rotational speed after the rotational speed of the starter motor is temporarily increased to exceed the steady-state rotational speed, the steady-state rotational speed being a rotational speed when the rotational speed of the internal combustion engine reaches a target rotational speed upon the starting.

Preferably, the hybrid vehicle further includes: a power storage device for storing electric power used to drive the motor; and a power generating structure for generating electric power for charging the power storage device, using an output of the internal combustion engine. When stored energy of the power storage device is lower than a reference value, the control device changes an operation point of the internal combustion engine so as to increase the rotational speed of the internal combustion engine with the output power of the internal combustion engine being constant.

Alternatively, the hybrid vehicle preferably further includes: a power storage device for storing electric power used to drive the motor; and a power generating structure for generating electric power for charging the power storage device, during vehicle traveling. The control device determines based on the traveling state whether or not it is necessary to perform charge level increasing control for the power storage device so as to prepare for a high output request to the internal combustion engine, and controls the power generating structure to increase stored energy of the power storage device when it is determined necessary to perform the charge level increasing control.

More preferably, the control device determines a ratio of output powers of the internal combustion engine and the motor in the total required power, and when an operation point of the internal combustion engine in accordance with the ratio of powers determined is included in the second operation region, the control device decreases the output power of the internal combustion engine so as to change the operation point of the internal combustion engine to fall within the first operation region, and modifies the ratio of powers so as to increase the output power of the motor in a reflection of the decrease of the output power of the internal combustion engine for the change of the operation point.

In another aspect of the present invention, in a control method for a hybrid vehicle including an internal combustion engine and a motor each for generating vehicle driving power, an operation region indicated by rotational speed and torque of the internal combustion engine includes a first operation region in which a fuel injection amount is calculated in accordance with a stoichiometric air-fuel ratio, and a second operation region in which an amount of fuel is increased to exceed the fuel injection amount that is in accordance with the stoichiometric air-fuel ratio so as to suppress temperature increase of a catalyst provided in an exhausting system of the internal combustion engine. The control method includes the steps of: calculating a total required power of the hybrid vehicle in accordance with a vehicle state; determining an output power of the internal combustion engine such that the torque and the rotational speed of the internal combustion engine are included in the first operation region in all vehicle states; and determining an output power of the motor based on the output power of the internal combustion engine so as to secure the total required power.

Preferably, the hybrid vehicle further includes a starter motor for motoring the internal combustion engine when starting the internal combustion engine. When starting the internal combustion engine, the fuel injection amount of the internal combustion engine is set in accordance with the stoichiometric air-fuel ratio, and the starter motor is controlled to generate positive torque for the motoring during a period of time until the rotational speed of the internal combustion engine reaches a target rotational speed upon the starting. Alternatively, when starting the internal combustion engine, the fuel injection amount of the internal combustion engine is set in accordance with the stoichiometric air-fuel ratio, and the starter motor is controlled to settle a rotational speed of the starter motor at a steady-state rotational speed after the rotational speed of the starter motor is temporarily increased to exceed the steady-state rotational speed, the steady-state rotational speed being a rotational speed when the rotational speed of the internal combustion engine reaches a target rotational speed upon the starting.

Preferably, the hybrid vehicle further includes: a power storage device for storing electric power used to drive the motor; and a power generating structure for generating electric power for charging the power storage device, during vehicle traveling. The control method further includes the step of changing an operation point of the internal combustion engine when stored energy of the power storage device is lower than a reference value, so as to increase the rotational speed of the internal combustion engine with the output power of the internal combustion engine being constant.

Alternatively, the hybrid vehicle preferably further includes: a power storage device for storing electric power used to drive the motor; and a power generating structure for generating electric power for charging the power storage device, during vehicle traveling. The control method further includes the steps of: determining based on the traveling state whether or not it is necessary to perform charge level increasing control for the power storage device so as to prepare for a high output request to the internal combustion engine; and controlling the power generating structure to increase stored energy of the power storage device when it is determined necessary to perform the charge level increasing control.

More preferably, the control method further includes the step of determining a ratio of output powers of the internal combustion engine and the motor in the total required power. When an operation point of the internal combustion engine in accordance with the ratio of powers determined is included in the second operation region, the step of determining the output power of the internal combustion engine decreases the output power of the internal combustion engine so as to change the operation point of the internal combustion engine to fall within the first operation region. The step of determining the ratio of output powers modifies the ratio of powers so as to increase the output power of the motor in a reflection of the decrease of the output power of the internal combustion engine for the change of the operation point.

Advantageous Effects of Invention

According to the present invention, the exhaust emission of the hybrid vehicle can be suppressed without causing insufficiency of the vehicle driving power and the exhaust emission purifier's (catalyst's) excessively high temperature resulting from increase of the exhaust gas temperature.

DESCRIPTION OF EMBODIMENTS

Figure 1:
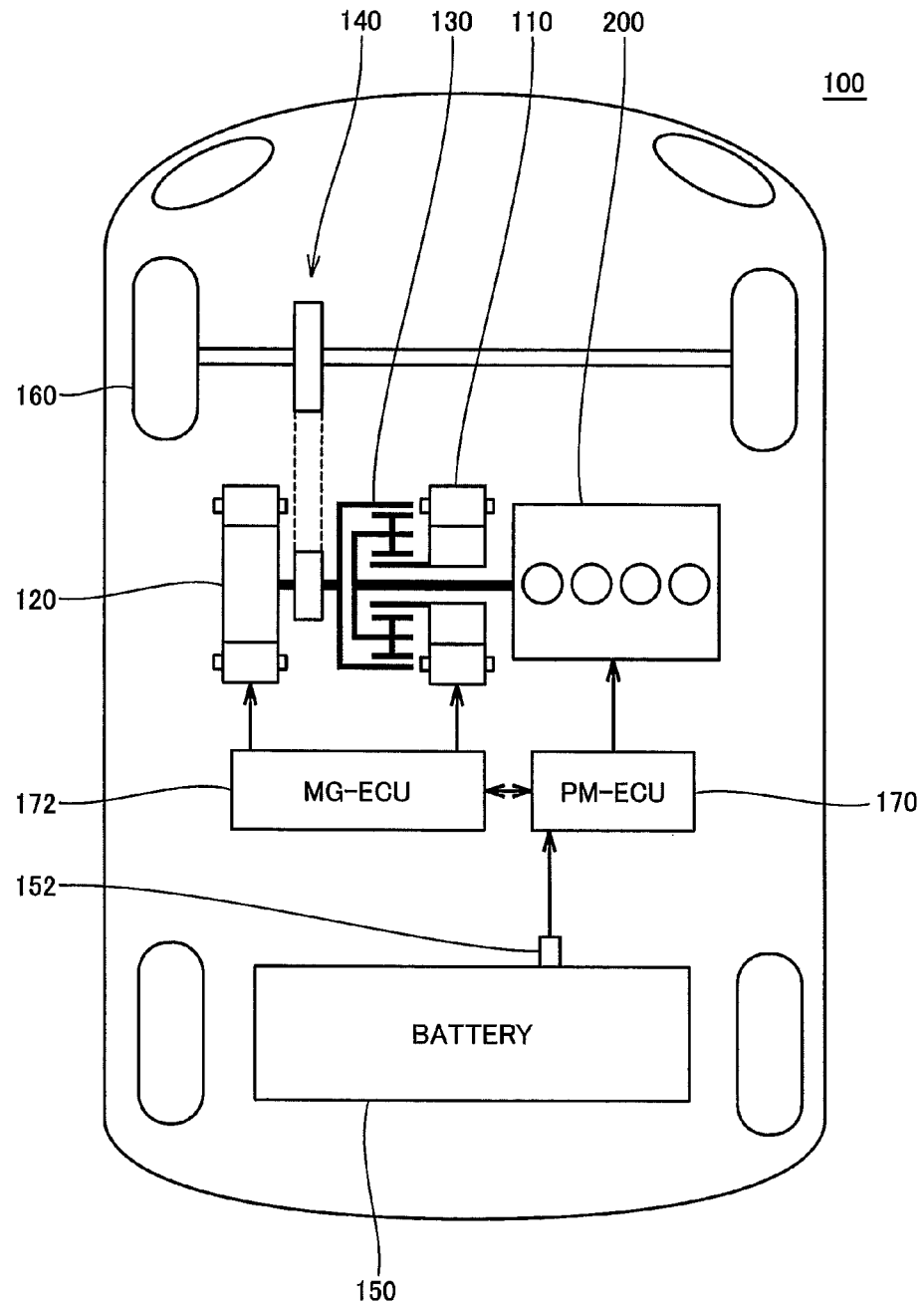
FIG. 1 is a block diagram for illustrating a hybrid vehicle including a control device according to a first embodiment of the present invention.

In the following, embodiments of the present invention will be described in detail with reference to figures. It should be noted that the same or corresponding portions are given the same reference characters and are not described repeatedly in principle.

First Embodiment

FIG. 1 is a block diagram for illustrating a hybrid vehicle 100 including a control device according to a first embodiment of the present invention.

Referring to FIG. 1, hybrid vehicle 100 includes a first MG (Motor Generator) 110, a second MG 120, a power split device 130, a speed reducer 140, a battery 150, a PM (Power train Manager)-ECU (Electronic Control Unit) 170, an MG (Motor Generator)-ECU 172, and an engine 200 corresponding to an "internal combustion engine".

As will be apparent in the description below, PM-ECU 170 implements traveling control, which is performed by a control device according to the first embodiment of the present invention. It should be noted that each of the ECUs such as PM-ECU 170 is configured to include a CPU (Central Processing Unit) and a memory both not shown in figures, and is configured to perform calculation process based on a detection value from each sensor, by means of software processing in accordance with a map and a program stored in the memory. Alternatively, at least a part of the ECU may be configured to perform predetermined mathematical operation process and/or logical operation process by means of hardware processing using a dedicated electronic circuit or the like.

First MG 110, second MG 120, and engine 200 are coupled to one another via power split device 130. Motive power generated by engine 200 is split into two paths by power split device 130. One of the paths is a path for driving front wheels 160 via speed reducer 140. The other is a path for driving first MG 110 for electric power generation. Hybrid vehicle 100 travels using driving power from at least one of engine 200 and second MG 120.

Figure 2:
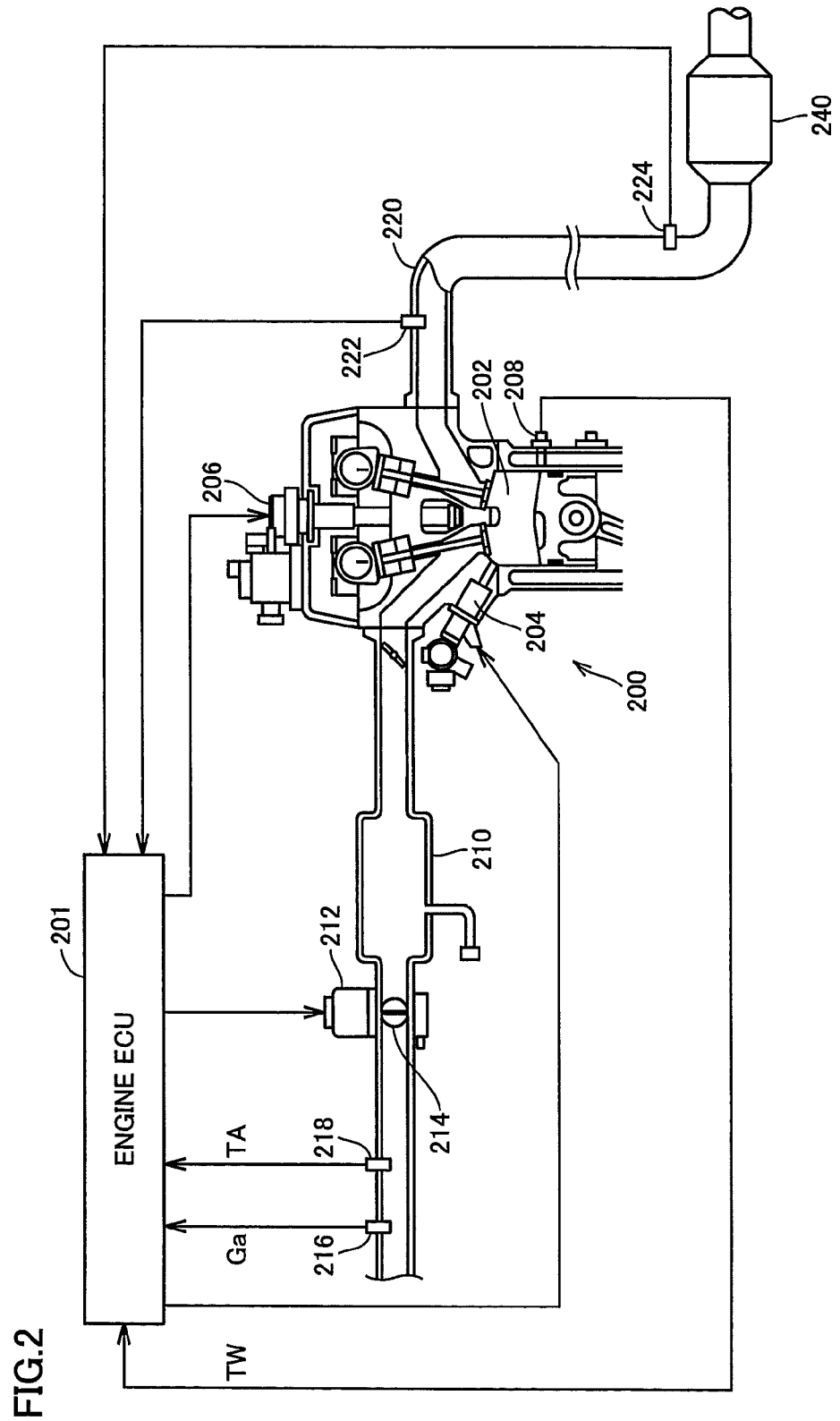
FIG. 2 illustrates a configuration of an engine shown in FIG. 1, in detail.

FIG. 2 illustrate a configuration of engine 200 shown in FIG. 1 in detail.

Referring to FIG. 2, in engine 200, air taken in via an air cleaner (not shown) flows through an intake pipe 210 and is then introduced into a combustion chamber 202 of engine 200. Depending on an opening position (throttle opening position) of a throttle valve 214, an amount of air to be introduced into combustion chamber 202 is adjusted. The throttle opening position is controlled by a throttle motor 212.

Fuel is stored in a fuel tank (not shown), is supplied via a fuel pump (not shown), and is injected from an injector 204 to combustion chamber 202. An air-fuel mixture of the air introduced from intake pipe 210 and the fuel injected from injector 204 is ignited using an ignition coil 206, which is controlled in accordance with a control signal from an ECU 400, and is burned.

Exhaust gas resulting from the burning of the air-fuel mixture is exhausted to outer atmosphere through a catalyst 240 provided in an exhausting system of engine 200. Catalyst 240 is representatively provided in exhaust pipe 220. Catalyst 240 collectively represents various types of exhaust emission purifiers.

Catalyst 240 is representatively formed of a three-way catalyst for purifying emissions (harmful substances such as hydrocarbon (HC), carbon monoxide (CO), and nitrogen oxide (NOx)) contained in the exhaust gas. Catalyst 240, which carries a noble metal basically composed of alumina and having platinum, palladium, and rhodium added thereto, is capable of simultaneously providing oxidation reaction of hydrocarbon and carbon monoxide and reduction reaction of nitrogen oxide. Catalyst 240 generally has such a characteristic that it exhibits higher exhaust air purification performance as the temperature becomes higher. However, when the temperature thereof becomes excessively high, the characteristic may be deteriorated and failure may take place. Hence, when catalyst 240 is in a low temperature state in which catalyst 240 is inactive, catalyst 240 needs to be warmed up quickly by actively increasing the exhaust gas temperature. On the other hand, after activation of catalyst 240, it is necessary to control the exhaust gas temperature not to become too high for the purpose of protection from overheat.

Engine ECU 201 receives signals from an engine coolant temperature sensor 208, an airflow meter 216, an intake air temperature sensor 218, an air-fuel ratio sensor 222, and an oxygen sensor 224.

Engine coolant temperature sensor 208 detects temperature (engine coolant temperature) TW of engine coolant. Airflow meter 216 is provided in intake pipe 210 at an upstream relative to throttle valve 214, and detects an intake air amount (amount of air taken into engine 200 per unit time) Ga. Intake air temperature sensor 218 detects temperature (intake air temperature) TA of the intake air. Air-fuel ratio sensor 222 detects a ratio of air and fuel in the exhaust gas. Oxygen sensor 224 detects oxygen concentration in the exhaust gas. Each of these sensors sends a signal indicating its detection result to engine ECU 201.

Engine ECU 201 controls engine 200 in accordance with a control target value from PM-ECU 170 of FIG. 1. Specifically, based on a signal sent from each sensor as well as a map and a program stored in the ROM, engine ECU 201 controls each of the elements of engine 200 such that each of rotational speed and torque of engine 200 coincides with the control target value. For example, engine ECU 201 controls ignition coil 206 to ignite at an appropriate timing, and controls throttle motor 212 to attain an appropriate throttle opening position. Further, engine ECU 201 controls injector 204 to inject an appropriate amount of fuel. Specifically, based on the signals from air-fuel ratio sensor 222 and oxygen sensor 224, the fuel injection amount is feedback-controlled to attain an appropriate value of air-fuel ratio.

Referring to FIG. 1 again, first MG 110 is a three-phase alternating current rotating electric machine having a U-phase coil, a V-phase coil, and a W-phase coil. First MG 110 generates electric power using the driving power of engine 200 that is split by power split device 130. The electric power generated by first MG 110 is used depending on the traveling state of the vehicle and SOC (State Of Charge), which indicates an amount of charges in battery 150.

For example, in the normal traveling, the electric power generated by first MG 110 is directly used as electric power for driving second MG 120. On the other hand, when the SOC of battery 150 is lower than the control target, electric power generated by first MG 110 is converted from alternating current to direct current by an inverter described later. Thereafter, the electric power is adjusted in voltage by a converter described later and then is stored in battery 150. It should be noted that the control target of the SOC may be a single SOC target value or may be a certain range of SOC.

Second MG 120 is a three-phase alternating current rotating electric machine having a U-phase coil, a V-phase coil, and a W-phase coil. Second MG 120 is driven using at least one of the electric power stored in battery 150 and the electric power generated by first MG 110.

Driving power of second MG 120 is transmitted to front wheels 160 through speed reducer 140. Accordingly, second MG 120 assists engine 200 or allows the vehicle to travel with the driving power from second MG 120. The rear wheels may be driven in place of or in addition to front wheels 160. Namely, second MG 120 corresponds to a "motor" for generating vehicle driving power.

At the time of regenerative braking of hybrid vehicle 100, second MG 120 is driven by front wheels 160 through speed reducer 140 and operates as an electric power generator. Thus, second MG 120 operates as a regenerative brake for converting braking energy into electric power. This electric power generated by second MG 120 is stored in battery 150.

First MG 110 and second MG 120 are controlled by means of, for example, PWM (Pulse Width Modulation) control performed by an inverter (not shown). It should be noted that a well-known, general technique can be employed for a method of controlling first MG 110 and second MG 120 using the PWM control, and is therefore not repeatedly described more in detail herein.

Power split device 130 is formed of a planetary gear including a sun gear, pinion gears, a carrier, and a ring gear. The pinion gears are engaged with the sun gear and the ring gear. The carrier supports the pinion gears such that they are rotatable on their own axes. The sun gear is coupled to the rotation shaft of first MG 110. The carrier is coupled to the crankshaft of engine 200. The ring gear is coupled to a rotation shaft of second MG 120 and speed reducer 140.

Figure 3:
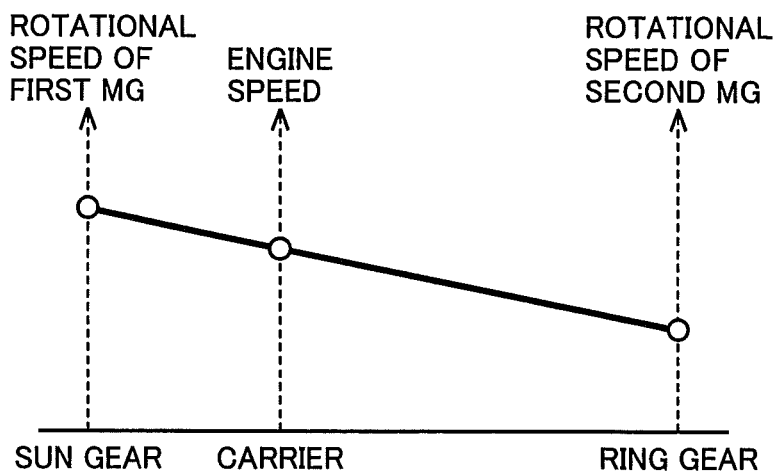
FIG. 3 is a nomographic chart showing a relation among rotational speeds of the engine, a first MG, and a second MG of the hybrid vehicle.

Engine 200, first MG 110, and second MG 120 are coupled to one another via the planetary gear unit. Accordingly, the rotational speeds of engine 200, first MG 110, and second MG 120 have a relation represented by a straight line in a nomographic chart as shown in FIG. 3.

Figure 4:
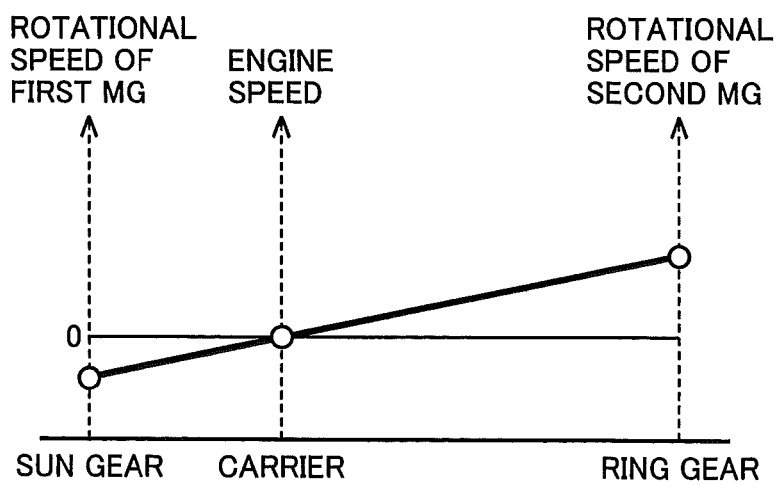
FIG. 4 is a nomographic chart when the engine of the hybrid vehicle is stopped.

Thus, as shown in FIG. 4, when hybrid vehicle 100 travels using only driving power of second MG 120 with engine 200 being stopped, the rotational speed of the output shaft of second MG 120 becomes positive and the rotational speed of the output shaft of first MG 110 becomes negative.

Figure 5:
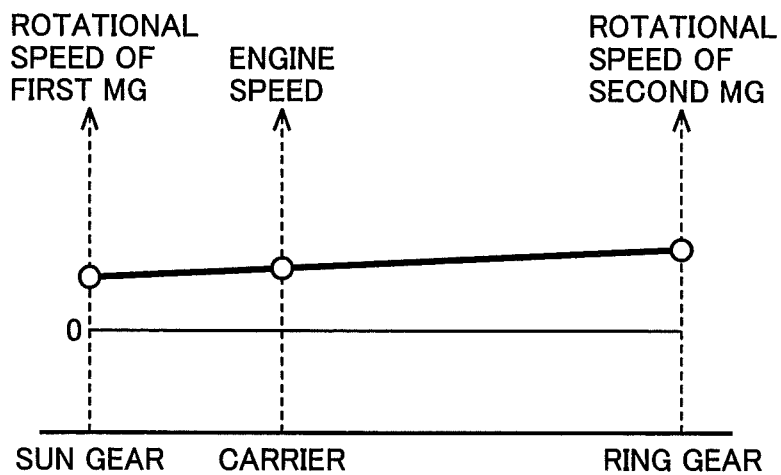
FIG. 5 is a nomographic chart after starting the engine of the hybrid vehicle.

When starting engine 200, as shown in FIG. 5, first MG 110 is operated as a motor so as to crank engine 200 using first MG 110, whereby the rotational speed of the output shaft of first MG 110 becomes positive. Namely, first MG 110 can be operated as a "starter motor".

Referring to FIG. 1 again, battery 150 is generally constituted of a battery pack configured such that a plurality of battery modules, each formed by integrating a plurality of battery cells, are connected in series. The voltage of battery 150 is, for example, about 200 V.

Battery 150 is charged with electric power generated by first MG 110 or second MG 120. Electric power stored in battery 150 can be used for driving of first MG 110 and second MG 120. Namely, battery 150 corresponds to a "power storage device".

States of battery 150 such as a temperature state, a voltage state, and a current state are detected by battery sensor 152. Battery sensor 152 collectively represents various types of sensors such as a temperature sensor, a voltage sensor, and a current sensor. The electric power charged to battery 150 is controlled not to exceed an upper limit value WIN. Likewise, electric power discharged from battery 150 is controlled not to exceed an upper limit value WOUT. Upper limit values WIN, WOUT are determined based on parameters of battery 150 such as SOC, temperature, and a rate of change in temperature.

As described above, engine 200 is controlled in accordance with the control target value provided by PM-ECU 170. PM-ECU 170 and MG-ECU 172 are connected to each other such that they can communicate with each other bidirectionally. PM-ECU 170 generates control target values (such as torque command values) for first MG 110 and second MG 120 in accordance with traveling control described below. In accordance with the control target values sent from PM-ECU 170, MG-ECU 172 controls first MG 110 and second MG 120.

In hybrid vehicle 100, traveling control to attain traveling suitable for a vehicle state is performed by PM-ECU 170. For example, when starting to travel the vehicle and when traveling in a low speed, hybrid vehicle 100 travels using output of second MG 120 with engine 200 being stopped as shown in the nomographic chart of FIG. 4. During a steady-state traveling, as shown in the nomographic chart of FIG. 5, engine 200 is started and hybrid vehicle 100 travels using the outputs of engine 200 and second MG 120. In particular, by operating engine 200 at a highly efficient operation point, hybrid vehicle 100 is improved in fuel consumption.

As described above, in hybrid vehicle 100, first MG 110 can serve as a "power generating structure" for generating electric power using the output of engine 200. In order to obtain electric power to charge battery 150 and/or electric power to be consumed by second MG 120, the output of engine 200 is increased as required and first MG 110 is controlled to generate electric power using the output thus increased. For example, when the SOC of battery 150 is decreased, engine 200 is started to charge battery 150 even in an operating state (such as low-speed/low-load traveling) in which engine 200 should have been stopped in the first place.

Thus, in hybrid vehicle 100 according to the present embodiment, the traveling control by PM-ECU 170 determines whether to operate engine 200 and determines the rotational speed and torque of engine 200 during the operation.

Figure 6:
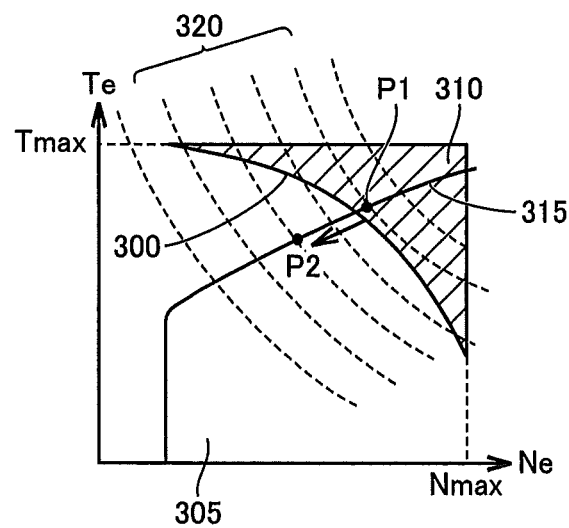
FIG. 6 is a conceptual view illustrating operation regions of the engine.

The following describes an operation region of engine 200 with reference to FIG. 6.

Referring to FIG. 6, operation region and operation point of engine 200 are represented by a combination of the rotational speed and the torque. Engine 200 has an operational region falling within the following range: engine torque Te<Tmax (maximum torque) and engine speed Ne<Nmax (maximum rotational speed).

In a high output region, heat energy resulting from fuel combustion in engine 200 is increased to cause increase of exhaust gas temperature. Accordingly, catalyst 240 (FIG. 2) may have an excessively high temperature. Hence, in such a high output region, the amount of fuel is controlled to be increased to exceed the fuel injection amount that is in accordance with the stoichiometric air-fuel ratio (i.e., OT amount increase). The OT amount increase leads to enriching the fuel, thereby decreasing the exhaust gas temperature. Accordingly, catalyst 240 is protected from having an excessively high temperature.

As shown in FIG. 6, based on the characteristic of engine 200, a boundary line 300 between a normal region 305 and an OT amount increase region 310 can be determined in advance. In normal region 305, a fuel injection amount based on the stoichiometric air-fuel ratio is applied. In OT amount increase region 310, the OT amount increase is required. Boundary line 300 is determined by specification of engine 200. Hence, for any engine, boundary line 300 can be specified in advance when designing the engine. Normal region 305 corresponds to a "first operation region", and OT amount increase region 310 corresponds to a "second operation region".

Also in hybrid vehicle 100 of the present embodiment, when the operation point of engine 200 enters OT amount increase region 310, the amount of fuel needs to be increased (OT amount increase). Such increase in amount of fuel causes increase of unburned CO to result in deteriorated emission, even when catalyst 240 is activated. Accordingly, there arises a possibility of failing to satisfy the requirements of severe regulations on emission.

To address this, the control device for hybrid vehicle 100 in the present embodiment performs traveling control for preventing emission from becoming deteriorated, as described below.

Figure 7:
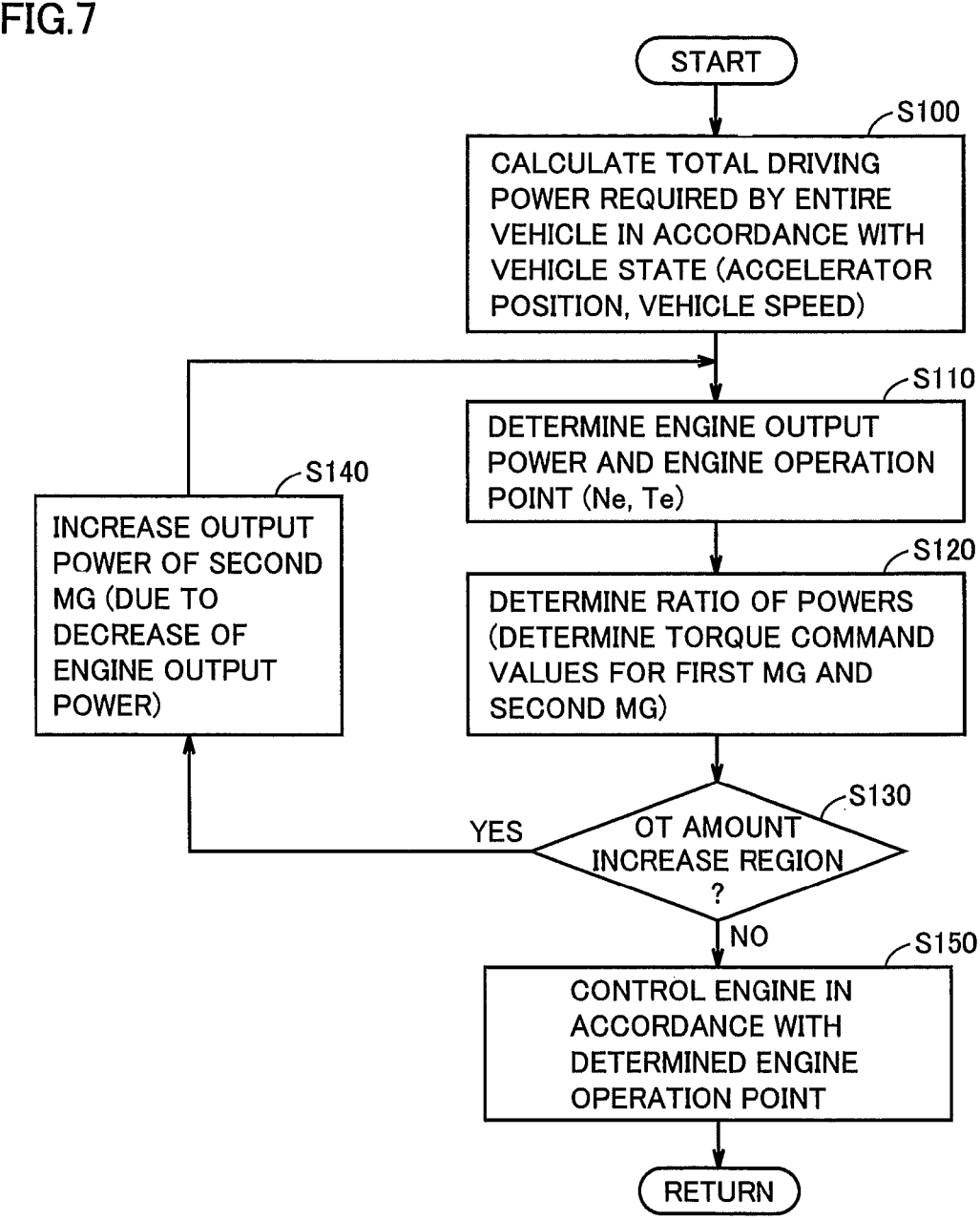
FIG. 7 is a flowchart illustrating the traveling control for the hybrid vehicle in the first embodiment of the present invention.

FIG. 7 is a flowchart illustrating the traveling control for the hybrid vehicle in the first embodiment of the present invention. The control process according to the flowchart shown in FIG. 7 is performed repeatedly by PM-ECU 170 in a predetermined control cycle. It should be noted that a process in each of steps in each of flowcharts such as the one in FIG. 7 can be performed by software processing performed by the ECU and/or hardware processing.

Referring to FIG. 7, in a step S100, PM-ECU 170 calculates total driving power required by hybrid vehicle 100, in accordance with a vehicle state (vehicle speed, pedal operation, or the like). Representatively, the total driving power is calculated in accordance with the accelerator position and the vehicle speed.

Then, in a step S110, PM-ECU 170 determines engine output power Pe based on the total driving power calculated by step S100. Then, PM-ECU 170 determines an operation point (hereinafter, also simply referred to as "engine operation point") of engine 200 for outputting engine output power Pe.

In doing so, charging power Pchg required to charge battery 150 is incorporated in engine output power Pe. For example, charging power Pchg is determined based on a comparison between SOC at present and a SOC control target (for example, 50% to 60%). Specifically, when the SOC is lower than the control target and charging is required, Pchg>0 is set. On the other hand, when the SOC is higher than the control target and discharging is required, Pchg<0 is set.

Referring to FIG. 6 again, an operation line 315 for efficiently operating engine 200 is set in advance. Operation line 315 is representatively a set of operation points in which fuel consumption is the best. Each of power contour lines 320 is a set of operation points in which output powers are the same.

In step S110, a point of intersection between operation line 315 and power contour line 320 corresponding to engine output power Pe is determined as the engine operation point.

Referring to FIG. 7 again, in a step S120, PM-ECU 170 determines torque command values for first MG 110 and second MG 120 in accordance with the engine operation point set in step S110, so as to generate the total driving power. When the total driving power is insufficient with the engine output attained with the determined engine operation point, second MG 120 assists to compensate the insufficiency of torque.

As a result, in order to secure the total driving power, a ratio of powers of first MG 110, second MG 120, and engine 200 in power (hereinafter, also referred to as "total required power Ptl") required by a whole of hybrid vehicle 100 are determined.

In a step S130, PM-ECU 170 determines whether or not the engine operation point determined in step S110 is in OT amount increase region 310 shown in FIG. 6. When the engine operation point is in the OT amount increase region (determined as YES in S130), PM-ECU 170 requests a change of the ratio of powers in a step S140, Specifically, in step S140, the engine output power is decreased and the output power of second MG 120 is increased.

Further, PM-ECU 170 performs step S110 again to re-determine an engine operation point that corresponds to the decreased engine output power. In this way, the engine operation point is changed. PM-ECU 170 performs step S120 again to determine a ratio of powers in accordance with the engine operation point thus changed.

Referring to FIG. 6 again, operation point P1 is in OT amount increase region 310. Namely, when the engine operation point determined in step S130 is P1, it is determined as YES in step S130. Further, when the engine output power is decreased in step S140, the engine operation point is changed from P1 toward P2.

Figure 8:
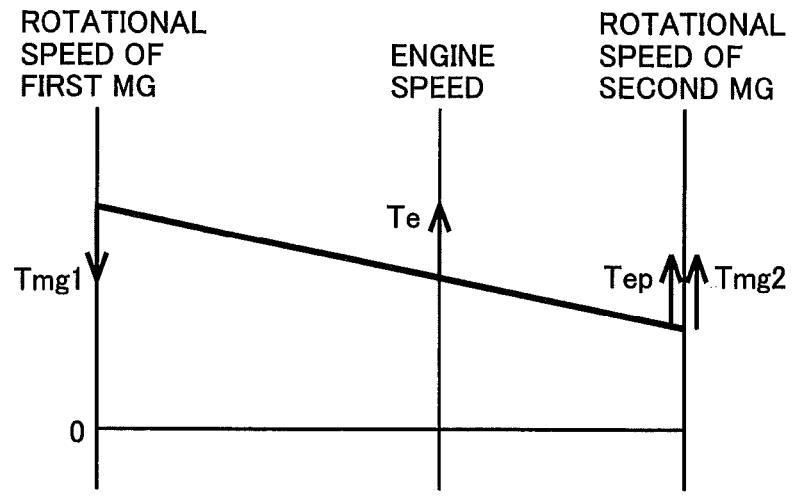
FIG. 8 is a nomographic chart in an engine operation point before changing in the first embodiment.

FIG. 8 shows a nomographic chart in operation point P1 before the change.

Referring to FIG. 8, the rotational speed and torque (Te) of engine 200 have values corresponding to operation point P1. The total driving power acting on the driving shaft of hybrid vehicle 100 is a total of engine direct-delivering torque Tep exerted from engine 200 and output torque Tmg2 of second MG 120. Engine direct-delivering torque Tep is given by Tep=−Tmg1/ρ, using output torque Tmg1 of first MG 110 and gear ratio ρ of power split device 130. Usually, output torque Tmg1 of first MG 110 is positive (Tmg1>0) during starting of engine 200, but is negative (Tmg1<0) during normal traveling.

Figure 9:
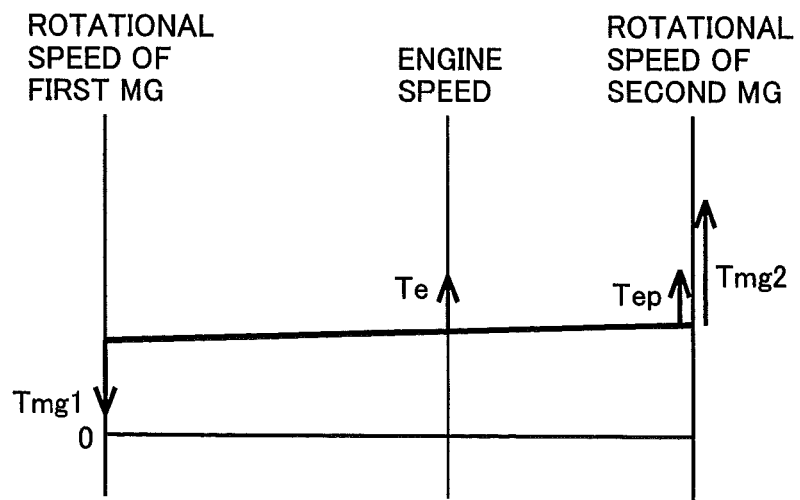
FIG. 9 is a nomographic chart in the engine operation point after changing in the first embodiment.

FIG. 9 shows a nomographic chart in operation point P2 after the change.

Now, FIG. 9 is compared with FIG. 8. In operation point P2, the rotational speed and torque (Te) of engine 200 are decreased due to the decrease of engine output power as compared with FIG. 8 (operation point P1). Accordingly, engine direct-delivering torque Tep is decreased as compared with that in operation point P2.

Meanwhile, in order to compensate the decrease of the engine output, output torque Tmg2 of second MG 120 is increased as compared with that in FIG. 8. As a result, the total of engine direct-delivering torque Tep and output torque Tmg2 of second MG 120, which are the torque (i.e., vehicle driving power) acting on the driving shaft, is secured in an equivalent manner to that in FIG. 8. In other words, even though the engine operation point is changed from P2 to P1, the vehicle driving power has a value corresponding to the total driving power calculated in step S100.

Referring to FIG. 7 again, PM-ECU 170 performs step S130 again, and determines whether or not the changed engine operation point is in OT amount increase region 310. When the changed engine operation point is in OT amount increase region 310, it is determined as YES in step S130. As a result, the change of the ratio of powers in step S140 and the change of the engine operation point in step S110 are performed again. Thus, the processes of steps S110 to S140 are repeated until it is determined as NO in step S130, i.e., until a ratio of powers is found such that the engine operation point falls within normal region 305.

When the engine operation point is determined and falls within normal region 305, PM-ECU 170 determines as NO in step S130 and proceeds the process to a step S150. In step S150, PM-ECU 170 generates a control target value for controlling engine 200 in accordance with the determined engine operation point falling within normal region 305. The control target value is sent to engine ECU 201.

As a result, according to the traveling control for the hybrid vehicle in the first embodiment, engine 200 is operated in normal region 305 in which the fuel injection amount in accordance with the stoichiometric air-fuel ratio is set, even in a vehicle state, such as a high-speed traveling state or a vehicle accelerating state, in which engine 200 would have been operated in the high output region (OT amount increase region 310) in the conventional traveling control. Therefore, in any vehicle state, engine 200 can be avoided from being operated in the high output region (OT amount increase region 310) in which the amount of fuel needs to be increased to prevent the catalyst from having an excessively high temperature due to increase of exhaust gas temperature. As a result, exhaust emission is prevented from being deteriorated.

Meanwhile, the output power decreased by changing the operation point of engine 200 is covered by the increased output of second MG 120, thereby securing the total driving power corresponding to the vehicle state as determined in step S100. In this way, the exhaust emission of the hybrid vehicle can be suppressed without causing insufficiency of the vehicle driving power and the catalyst's excessively high temperature resulting from increase of exhaust gas temperature.

Second Embodiment

In order to implement the traveling control for the hybrid vehicle in the first embodiment, the torque compensation by increasing the output of second MG 120 is required. Accordingly, when stored energy (SOC) of battery 150 becomes insufficient, it becomes difficult to perform such traveling control.

In the second embodiment, the following describes traveling control including a process for securely implementing the torque compensation by second MG 120. It should be noted that in the second and later embodiments, the portions same as those in the first embodiment are not particularly mentioned and described.

Figure 10:
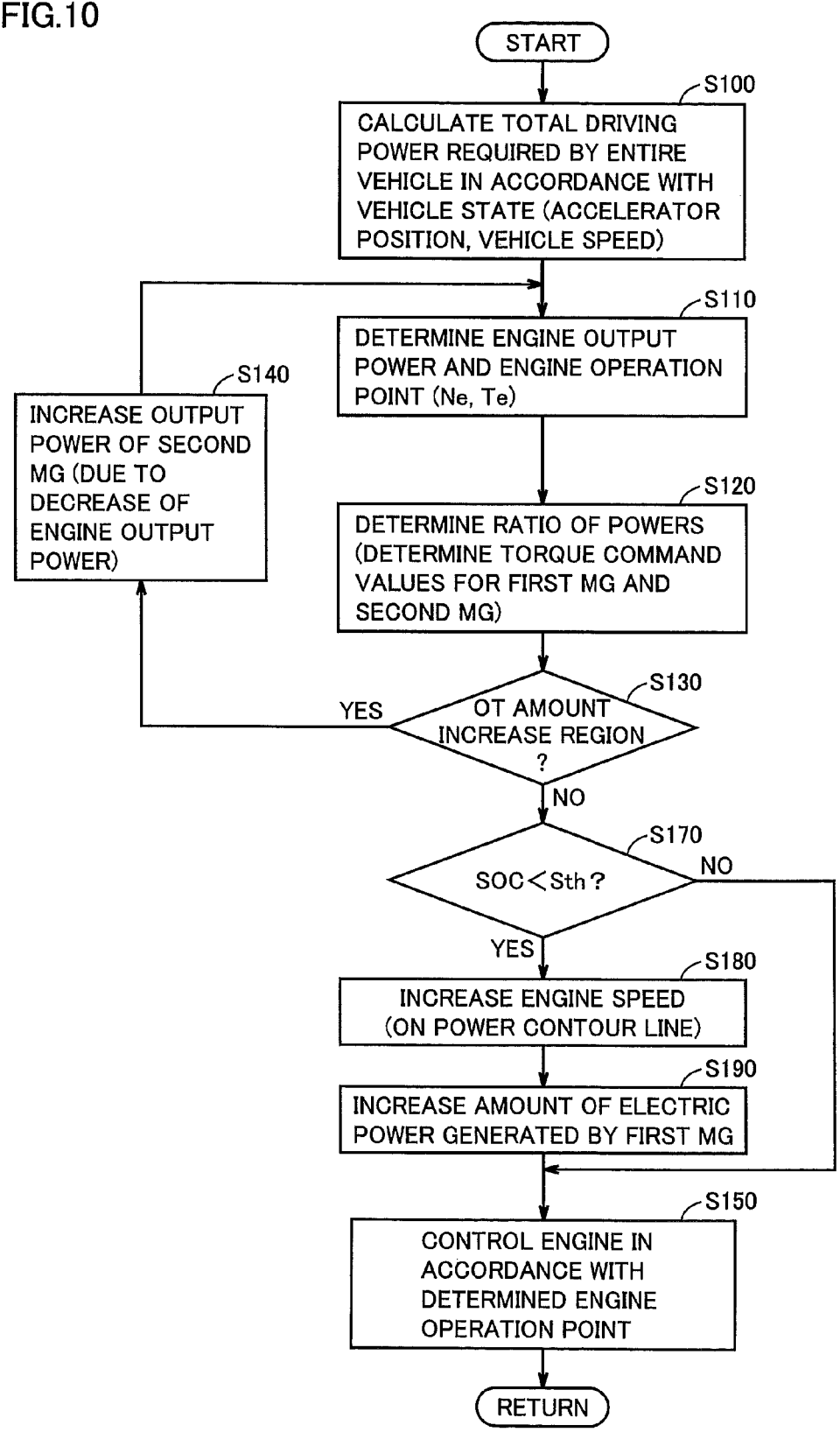
FIG. 10 is a flowchart illustrating traveling control for a hybrid vehicle in a second embodiment of the present invention.

FIG. 10 is a flowchart illustrating the traveling control for the hybrid vehicle in the second embodiment of the present invention. The control process according to the flowchart shown in FIG. 10 is performed repeatedly by PM-ECU 170 in a predetermined control cycle.

Comparing FIG. 10 with FIG. 7, the traveling control for the hybrid vehicle in the second embodiment is different in that steps S170 to S190 are performed when it is determined as NO in step S130, i.e., after an engine operation point falling within normal region 305 is determined. Control processes in steps other than these are the same as those described in FIG. 7 and therefore are not described repeatedly.

When the engine operation point falling within normal region 305 is determined (determined as NO in S130), PM-ECU 170 compares the SOC at present with a reference value Sth in step S170. Reference value Sth can be set to provide a margin for a SOC region in which it is difficult to increase the torque of second MG 120. For example, reference value Sth is at a level lower than the normal SOC control target.

When the SOC at present is lower than reference value Sth (determined as YES in S170), PM-ECU 170 changes the engine operation point in step S180 so as to increase the engine speed with the output power of engine 200 being kept constant. Further, in step S190, PM-ECU 170 increases an amount of electric power generated by first MG 110, by utilizing the increased engine speed (step S180) resulting from the change of operation point.

Figure 11:
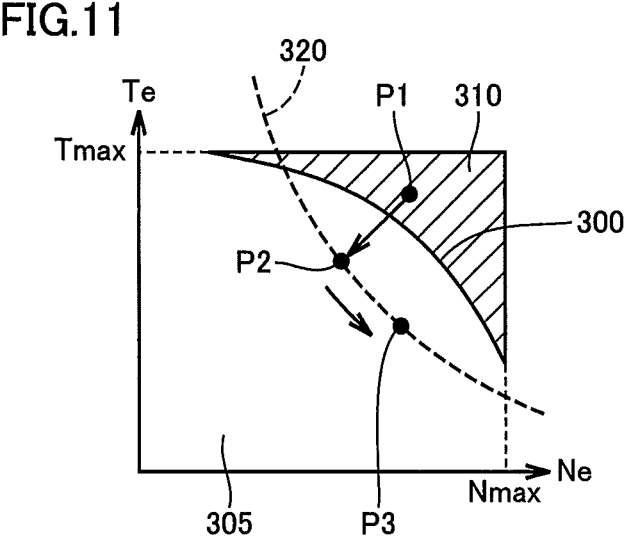
FIG. 11 is a conceptual view illustrating change of an operation point in the second embodiment.

Referring to FIG. 11, operation point P2 is the engine operation point set in normal region 305 by the traveling control in the first embodiment. When the SOC is low, an operation point P3, in which engine speed Ne is increased on power contour line 320, is set in step S180 (FIG. 10). In this way, the engine speed can be increased while maintaining the ratio of powers with which the operation point of engine 200 falls within normal region 305.

Figure 12:
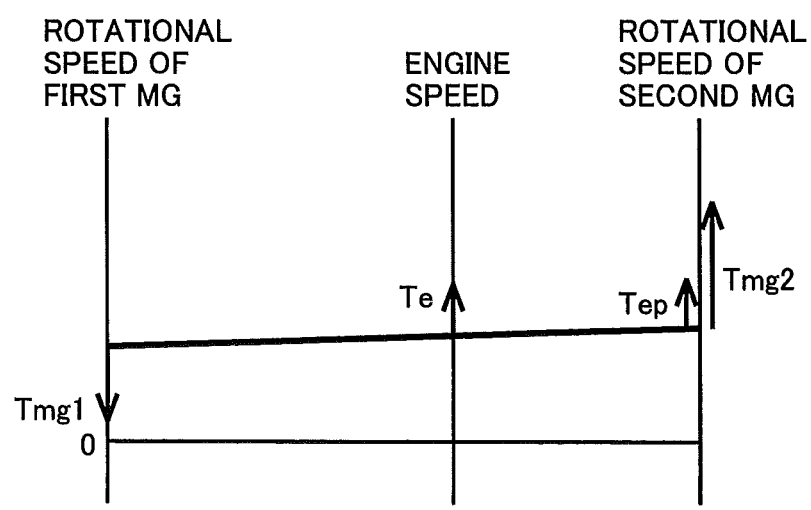
FIG. 12 is a nomographic chart in the engine operation point before changing in the second embodiment.
Figure 13:
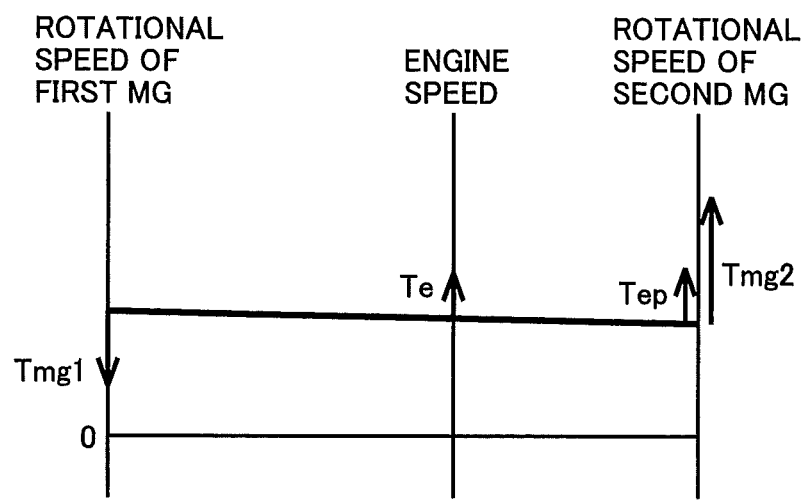
FIG. 13 is a nomographic chart in the engine operation point after changing in the second embodiment.

FIG. 12 shows a nomographic chart in operation point P2. FIG. 13 shows a nomographic chart in operation point P3. The nomographic chart of FIG. 12 is equivalent to the nomographic chart shown in FIG. 9.

Comparing FIG. 13 with FIG. 12, in operation point P3, engine torque Te is decreased whereas the engine speed is increased. As a result, the rotational speed of first MG 110 is increased to attain the same rotational speed of the driving shaft (i.e., vehicle speed). The electric power generated by first MG 110 is in proportion to a product of the torque and the rotational speed. Hence, by changing the engine operation point from P2 to P3, the electric power generated by first MG 110 can be increased.

Referring to FIG. 10 again, when the SOC at present is higher than reference value Sth (determined as NO in S170), PM-ECU 170 skips the processes of steps S180, S190. Alternatively, in the case where the engine operation point has not been changed in steps S130, S140, PM-ECU 170 may skip the processes of steps S180, S190 irrespective of the SOC.

In step S150, PM-ECU 170 generates a control target value for controlling engine 200, in accordance with the engine operation point determined in step S120 or the engine operation point changed in S180. Then, PM-ECU 170 sends it to engine ECU 201. In each of the cases, the engine operation point is determined to fall within normal region 305 as described above.

Thus, according to the traveling control for the hybrid vehicle in the second embodiment, electric power required to increase the output of second MG 120 by the traveling control in the first embodiment can be generated by increasing the amount of electric power generated by first MG 110, even when the stored energy of battery 150 is little (the level of the SOC is low).

Alternatively, as described above, by performing the processes of steps S170 to S190 only when the engine operation point is changed (S130, S140), the change of the engine operation point for increasing the electric power generated by first MG 110 can be necessary minimum. In other words, when the SOC is low (SOC<Sth) even though the change of the engine operation point is necessary, electric power for increasing the output of second MG 120 is generated. On the other hand, when this is not necessary, engine efficiency can be prevented from being decreased.

Further, by configuring to always perform the processes of steps S170 to S190, the SOC of the battery can be made higher than reference value Sth, thus preparing for the increase of the output of second MG 120 in the traveling control in the first embodiment even in a vehicle state in which the output of second MG 120 is not high.

Third Embodiment

A ratio of powers with which the engine operation point falls within OT amount increase region 310 (FIG. 6) is required only in a certain special vehicle state (high-speed/high-load state) in which the accelerator position becomes large during high vehicle speed. For example, the engine operation point is set to fall within the OT amount increase region, in a traveling state involving accelerating for overtaking or traveling up a hill during high-speed traveling.

Thus, in the third embodiment, the following describes traveling control for increasing the level of the stored energy (SOC) of battery 150 in advance in the case where there is a possibility that such a special vehicle state takes place.

Figure 14:
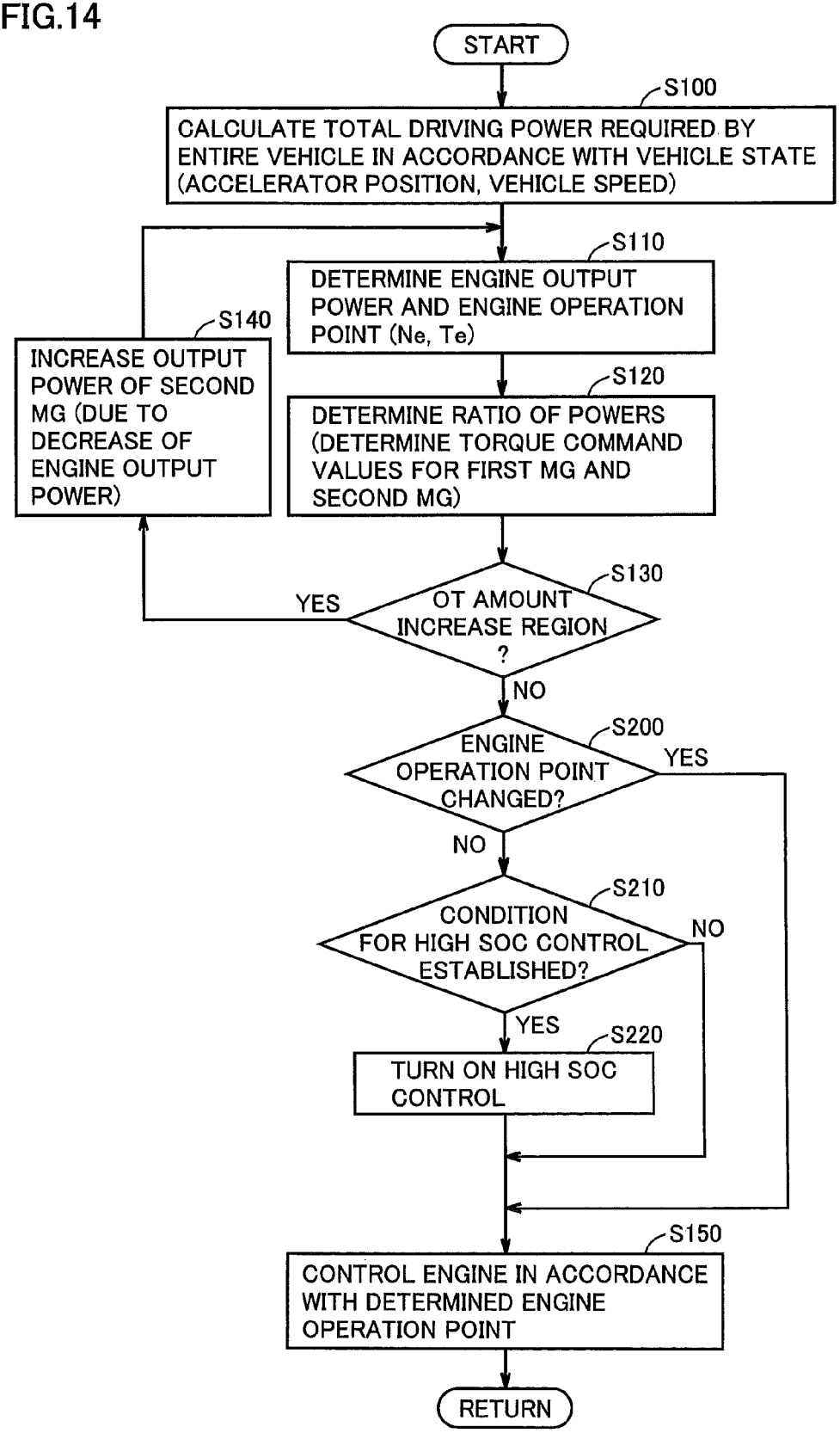
FIG. 14 is a flowchart illustrating traveling control for a hybrid vehicle in a third embodiment of the present invention.

FIG. 14 is a flowchart illustrating the traveling control for the hybrid vehicle in the third embodiment of the present invention. The control process according to the flowchart shown in FIG. 14 is performed repeatedly by PM-ECU 170 in a predetermined control cycle.

Comparing FIG. 14 with FIG. 7, the traveling control for the hybrid vehicle in the third embodiment is different in that steps S200 to S220 are further performed when it is determined as NO in step S130, i.e., after the engine operation point falling within normal region 305 is determined. Control processes in steps other than these are the same as those described in FIG. 7 and therefore are not described repeatedly.

In step S200, PM-ECU 170 determines whether or not the engine operation point has been changed in steps S130, S140. When the engine operation point has not been changed (determined as NO in S200), PM-ECU 170 determines in step S210 whether or not the vehicle is in a traveling state that requires high SOC control (charge level increasing control) for preliminarily increasing the charge level (SOC) of battery 150, so as to prepare for the increase of the output of second MG 120 in the traveling control according to the first embodiment. Namely, in step S210, it is determined whether or not the traveling state satisfies a predetermined condition for the high SOC control.

The condition for the high SOC control is set to cover a traveling state expected to involve occurrence of a vehicle state in which engine 200 is requested to achieve a high output such that the engine operation point is changed by the traveling control according to the first embodiment. For example, when high-speed traveling equal to or faster than a predetermined speed such as 100 km/h continues for a predetermined period of time, the condition for the high SOC control is established, whereby it is determined as YES in step S210. Alternatively, also when it is predicted based on navigation information or the like that the vehicle will travel up a hill at a high vehicle speed, the condition for the high SOC control is established based on slope and distance of the hill or a traveling distance to the hill.

When the condition for the high SOC control is established (determined as YES in S210), PM-ECU 170 turns on the high SOC control in step S220 so as to increase the SOC level. As the high SOC control, the SOC control target of battery 150 is increased to exceed the normal SOC control target (such as 50% to 60%), thereby facilitating charging on battery 150. In this way, charging power Pchg for charging battery 150 to achieve the temporarily increased SOC control target is incorporated in total required power Ptl, thereby forcibly charging battery 150. Alternatively, the high SOC control can be implemented by offsetting charging power Pchg in the positive direction, which is determined based on the SOC at present and the SOC control target.

While the high SOC control is on, the ratio of powers of engine 200, first MG 110, and second MG 120 and the operation point are determined based on charging power Pchg thus increased, thereby facilitating charging on battery 150.

When the condition for the high SOC control is not established (determined as NO in S210), PM-ECU 170 skips the process of step S220. Further, when the engine operation point has been changed (determined as YES in S200), the processes of steps S210, S220 are skipped. This is because the high SOC control in step S220 is to prepare for the increase of power consumption of second MG 120 due to the change of the engine operation point. When step S220 is not performed, the high SOC control is automatically turned off.

In step S150 similar to that in FIG. 7, PM-ECU 170 generates a control target value for controlling engine 200, in accordance with the determined engine operation point falling within normal region 305. It should be noted that when the high SOC control is turned on, the high SOC control is reflected, from at least next control cycle, in determining the ratio of powers and the operation point, but the ratio of powers and the operation point may be modified in this control cycle.

Figure 15:
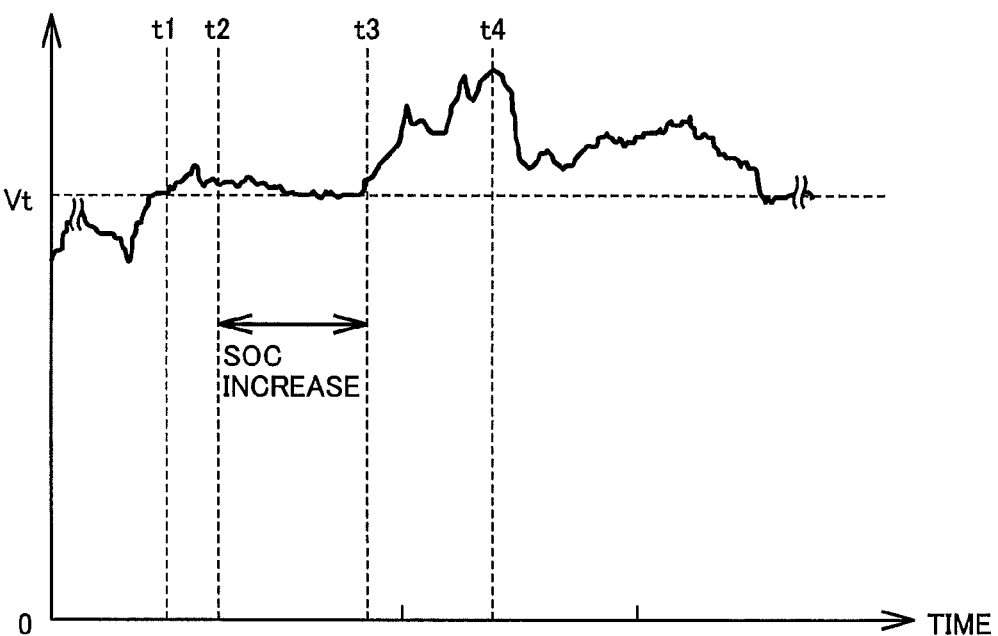
FIG. 15 is a graph showing exemplary traveling control for the hybrid vehicle in the third embodiment.

FIG. 15 shows exemplary traveling control for the hybrid vehicle in the third embodiment.

Referring to FIG. 15, when high-speed traveling exceeding a predetermined speed Vt continues for a predetermined time or more during a period of time t1 to time t2, it is determined as YES at time t2 in step S200 of FIG. 14.

As a result, from time t2, the high SOC control is performed to increase the SOC of battery 150. Then, in acceleration traveling during a period of time t3 to time t4, the traveling control described in the first embodiment is performed. Namely, the output of second MG 120 is increased in order to bring the engine operation point out of OT amount increase region 310 (FIG. 6). Although electric power needs to be supplied from battery 150 so as to increase the output of second MG 120, this electric power can be surely secured by the SOC increased by the high SOC control performed during the period of time t2 to time t3.

Thus, according to the traveling control for the hybrid vehicle in the third embodiment, the SOC of battery 150 can be increased in advance through the high SOC control in the case where there is a possibility that the vehicle will be brought into a vehicle state in which engine 200 is requested to attain a high output requiring a change of the engine operation point. As a result, the traveling control according to the first embodiment, which involves the increase of the output of second MG 120, can be performed more securely.

It should be noted that the traveling control according to the second embodiment can be combined with the traveling control according to the third embodiment. For example, in the case where the engine operation point has been changed in steps S130, S140 (in the case where it is determined as YES in S200), the control process may be adapted to perform the processes of steps S170 to S190 of FIG. 7. In this way, even in the case where the SOC of battery 150 is decreased because the high-speed/high-load vehicle state continues for a long period of time, electric power required for increasing the output of second MG 120 can be generated by increasing the amount of electric power generated by first MG 110.

Fourth Embodiment

Depending on a vehicle state, the hybrid vehicle travels only using the output of second MG 120 with engine 200 being stopped, as described above. Namely, in the hybrid vehicle, engine 200 is intermittently operated in accordance with a vehicle state.

Hence, in the case where a total amount of exhaust emission in a certain traveling mode is regulated, it is also important to suppress exhaust emission when starting engine 200 due to the intermittent operation of the engine.

In the fourth embodiment, the following describes engine starting control for suppressing exhaust emission, as one exemplary traveling control for the hybrid vehicle.

Figure 16:
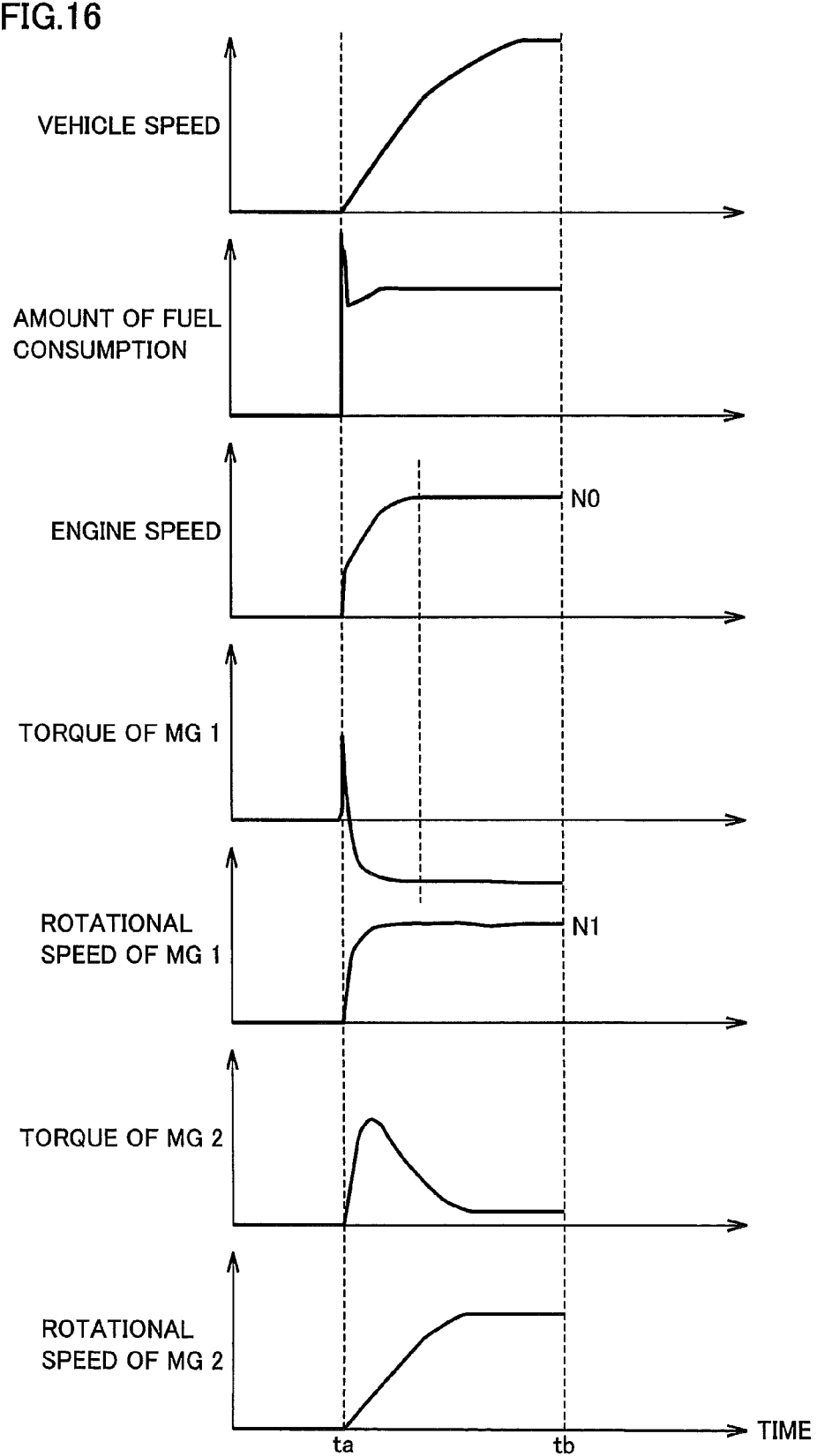
FIG. 16 is a waveform diagram illustrating normal engine starting control for the hybrid vehicle.
Figure 17:
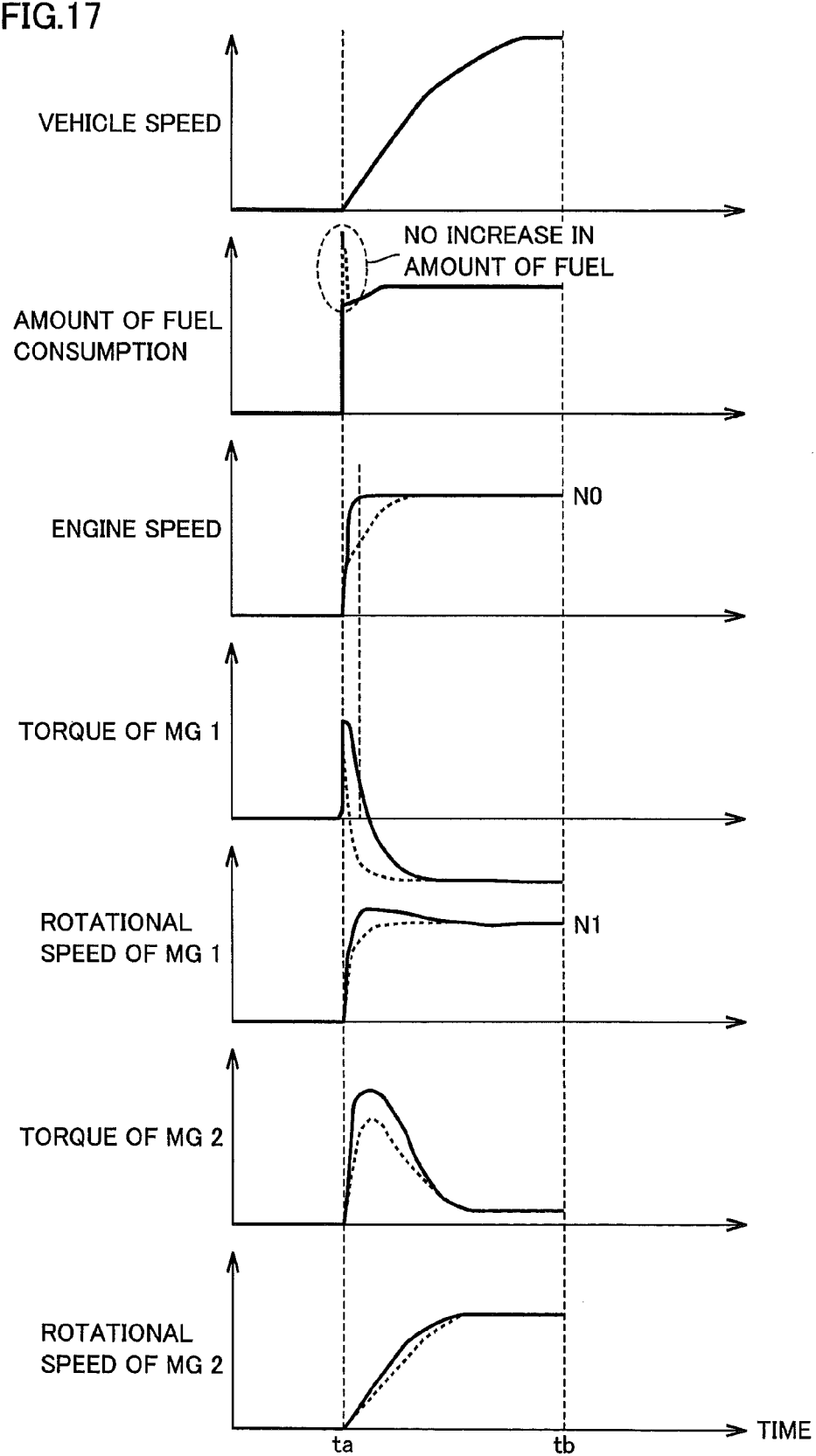
FIG. 17 is a waveform diagram illustrating engine starting control according to traveling control for a hybrid vehicle in a fourth embodiment.

FIG. 16 is a waveform diagram illustrating normal engine starting control for the hybrid vehicle. Each of FIG. 16 and FIG. 17 shows waveforms for operations in starting the engine when starting the vehicle.

Referring to FIG. 16, hybrid vehicle 100 increases the engine speed by motoring engine 200 using positive torque of first MG 110, and starts fuel injection. When starting the engine, the fuel injection amount is temporarily increased in order to secure the engine output. In other words, by temporarily rendering the air-fuel ratio richer than the stoichiometric air-fuel ratio, energy for surely starting engine 200 is secured. However, this increased amount of fuel causes generation of unburned CO, thus resulting in deteriorated exhaust emission.

First MG 110 generates positive torque for motoring, and thereafter the output torque is reduced. At the time of completion in starting the engine, first MG 110 generates negative torque. In other words, first MG 110 is adapted to generate negative torque before the engine speed reaches target rotational speed N0 during the engine start.

As a result, the rotational speed of first MG 110 is monotonously increased toward a steady-state rotational speed N1, which is attained at the time of completion of the engine start. This steady-state rotational speed N1 is determined by target rotational speed N0 of engine 200 at the start of the engine and the gear ratio (p) of power split device 130.

Thus, in the normal engine start of hybrid vehicle 100, the motoring by first MG 110 is auxiliary and surely secures energy for starting the engine by means of the increase in amount of fuel. It is understood that until completion of the starting of engine 200, driving power for attaining vehicle speed is covered by the torque of second MG 120.

FIG. 17 shows a waveform diagram illustrating engine starting control according to traveling control for the hybrid vehicle in the fourth embodiment. In FIG. 17, for comparison, the waveforms for operations in the normal engine starting control shown in FIG. 16 are indicated by dotted lines.

Referring to FIG. 17, in the engine starting control according to, the fourth embodiment, the motoring of first MG 110 is performed for a longer period of time than that in the normal control (FIG. 16). Particularly, first MG 110 generates positive torque until the engine speed reaches target rotational speed N0 upon the starting thereof. Accordingly, unlike in FIG. 16, engine 200 can be started without increasing the amount of fuel. The rotational speed of first MG 110 is also raised quickly as compared with the case of FIG. 16. Particularly, this engine starting control is different from FIG. 16 in that the rotational speed of first MG 110 is increased to exceed steady-state rotational speed N1 before the completion of engine start and then becomes steady-state rotational speed N1 upon the completion of engine start.

Further, in order to cover the slower increase of the engine speed than that in FIG. 16, the output torque and rotational speed of second MG 120 are increased more quickly than those in FIG. 16. In this way, change in vehicle speed during the engine start is substantially the same as that in FIG. 16.

Thus, in the traveling control for the hybrid vehicle in the fourth embodiment, the motoring by first MG 110 is enhanced, thus setting the fuel injection amount in accordance with the stoichiometric air-fuel ratio even when starting the engine. As a result, unlike the normal engine starting control involving the increase of fuel amount as shown in FIG. 16, exhaust emission is never deteriorated upon the engine start. As a result, a total of amounts of emissions during traveling involving engine start and engine stop can be suppressed. The traveling control according to the fourth embodiment can be appropriately combined with the traveling control described in the first to third embodiments.

Thus, according to the traveling controls for the hybrid vehicle in the first to fourth embodiments, the amount of fuel does not need to be increased to prevent the catalyst from having an excessively high temperature and also the amount of fuel does not need to be increased upon the engine start, thereby suppressing the exhaust emission throughout the period of traveling. Accordingly, it is expected to satisfy the requirements of severe regulations on emission.

The traveling control for the hybrid vehicle in the present embodiment can be also applied to configurations different from hybrid vehicle 100 illustrated in FIG. 1 in terms of driving systems of hybrid vehicles. Specifically, the traveling controls according to the first to third embodiments can be applied to any configuration in which both the engine and the motor can generate vehicle driving power such as a parallel type hybrid vehicle, irrespective of the number of motors (motor generators) and the configuration of the driving system provided. Further, the traveling control according to the fourth embodiment can be also applied to any configuration provided with a motor that motors the engine when starting the engine.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be applied to a hybrid vehicle including an engine and a motor as a driving power source.

REFERENCE SIGNS LIST

100: hybrid vehicle; 110: first MG; 120: second MG; 130: power split device; 140: speed reducer; 150: battery; 152: battery sensor; 160: front wheel; 200: engine; 201: engine ECU; 202: combustion chamber; 204: injector; 206: ignition coil; 208: engine coolant temperature sensor; 210: intake pipe; 212: throttle motor; 214: throttle valve; 216: airflow meter; 218: sensor; 222: air-fuel ratio sensor; 224: oxygen sensor; 220: exhaust pipe; 240: catalyst; 300: boundary line; 305: normal region; 310: OT amount increase region; 315: operation line; 320: power contour line; N1: steady-state rotational speed; Ne: engine speed; P1, P2, P3: operation point; Sth: SOC reference value; Te: engine torque; Tep: engine direct-delivering torque; Tmg1, Tmg2: output torque (MG); Vt: predetermined speed; t1-t4, ta, tb: time.

The invention claimed is:

1. A control device for a hybrid vehicle including an internal combustion engine and a motor each for generating vehicle driving power, wherein
an operation region indicated by rotational speed and torque of said internal combustion engine includes a first operation region in which a fuel injection amount is calculated in accordance with a stoichiometric air-fuel ratio, and a second operation region in which an amount of fuel is increased to exceed the fuel injection amount that is in accordance with said stoichiometric air-fuel ratio so as to suppress temperature increase of a catalyst provided in an exhausting system of said internal combustion engine, and said control device calculates a total required power of said hybrid vehicle in accordance with a vehicle state, determines an output power of said internal combustion engine such that the torque and the rotational speed of said internal combustion engine are included in said first operation region in all vehicle states, and determines an output power of said motor based on the output power of said internal combustion engine so as to secure said total required power.

2. The control device for the hybrid vehicle according to claim 1, wherein said hybrid vehicle further includes a starter motor for motoring said internal combustion engine when starting said internal combustion engine, and when starting said internal combustion engine, said control device sets the fuel injection amount of said internal combustion engine in accordance with said stoichiometric air-fuel ratio, and controls said starter motor to generate positive torque for said motoring during a period of time until the rotational speed of said internal combustion engine reaches a target rotational speed upon the starting.

3. The control device for the hybrid vehicle according to claim 1, wherein said hybrid vehicle further includes a starter motor for motoring said internal combustion engine when starting said internal combustion engine, and when starting said internal combustion engine, said control device sets the fuel injection amount of said internal combustion engine in accordance with said stoichiometric air-fuel ratio, and controls said starter motor to settle a rotational speed of said starter motor at a steady-state rotational speed after the rotational speed of said starter motor is temporarily increased to exceed the steady-state rotational speed, said steady-state rotational speed being a rotational speed when the rotational speed of said internal combustion engine reaches a target rotational speed upon the starting.

4. The control device for the hybrid vehicle according to claim 1, wherein said hybrid vehicle further includes:
a power storage device for storing electric power used to drive said motor; and
a power generating structure for generating electric power for charging said power storage device, using an output of said internal combustion engine, and when stored energy of said power storage device is lower than a reference value, said control device changes an operation point of said internal combustion engine so as to increase the rotational speed of said internal combustion engine with the output power of said internal combustion engine being constant.

5. The control device for the hybrid vehicle according to claim 1, wherein said hybrid vehicle further includes:
a power storage device for storing electric power used to drive said motor; and
a power generating structure for generating electric power for charging said power storage device, during vehicle traveling, and said control device determines based on the traveling state whether or not it is necessary to perform charge level increasing control for said power storage device so as to prepare for a high output request to said internal combustion engine, and controls said power generating structure to increase stored energy of said power storage device when it is determined necessary to perform said charge level increasing control.

6. The control device for the hybrid vehicle according to claim 1, wherein said control device determines a ratio of output powers of said internal combustion engine and said motor in said total required power, and when an operation point of said internal combustion engine in accordance with the ratio of powers determined is included in said second operation region, said control device decreases the output power of said internal combustion engine so as to change the operation point of said internal combustion engine to fall within said first operation region, and modifies the ratio of powers so as to increase the output power of said motor in a reflection of the decrease of the output power of said internal combustion engine for the change of said operation point.

7. A control method for a hybrid vehicle including an internal combustion engine and a motor each for generating vehicle driving power, an operation region indicated by rotational speed and torque of said internal combustion engine including a first operation region in which a fuel injection amount is calculated in accordance with a stoichiometric air-fuel ratio, and a second operation region in which an amount of fuel is increased to exceed the fuel injection amount that is in accordance with said stoichiometric air-fuel ratio so as to suppress temperature increase of a catalyst provided in an exhausting system of said internal combustion engine, the control method comprising the steps of:
calculating a total required power of said hybrid vehicle in accordance with a vehicle state;
determining an output power of said internal combustion engine such that the torque and the rotational speed of said internal combustion engine are included in said first operation region in all vehicle states; and
determining an output power of said motor based on the output power of said internal combustion engine so as to secure said total required power.

8. The control method for the hybrid vehicle according to claim 7, wherein said hybrid vehicle further includes a starter motor for motoring said internal combustion engine when starting said internal combustion engine, and when starting said internal combustion engine, the fuel injection amount of said internal combustion engine is set in accordance with said stoichiometric air-fuel ratio, and said starter motor is controlled to generate positive torque for said motoring during a period of time until the rotational speed of said internal combustion engine reaches a target rotational speed upon the starting.

9. The control method for the hybrid vehicle according to claim 7, wherein said hybrid vehicle further includes a starter motor for motoring said internal combustion engine when starting said internal combustion engine, and when starting said internal combustion engine, the fuel injection amount of said internal combustion engine is set in accordance with said stoichiometric air-fuel ratio, and said starter motor is controlled to settle a rotational speed of said starter motor at a steady-state rotational speed after the rotational speed of said starter motor is temporarily increased to exceed the steady-state rotational speed, said steady-state rotational speed being a rotational speed when the rotational speed of said internal combustion engine reaches a target rotational speed upon the starting.

10. The control method for the hybrid vehicle according to claim 7, wherein
said hybrid vehicle further includes:
a power storage device for storing electric power used to drive said motor; and
a power generating structure for generating electric power for charging said power storage device, using an output of said internal combustion engine,
the control method further comprising the step of changing an operation point of said internal combustion engine when stored energy of said power storage device is lower than a reference value, so as to increase the rotational speed of said internal combustion engine with the output power of said internal combustion engine being constant.

11. The control method for the hybrid vehicle according to claim 7, wherein
said hybrid vehicle further includes:
a power storage device for storing electric power used to drive said motor and
a power generating structure for generating electric power for charging said power storage device, during vehicle traveling,
the control method further comprising the steps of:
determining based on the traveling state whether or not it is necessary to perform charge level increasing control for said power storage device so as to prepare for a high output request to said internal combustion engine; and
controlling said power generating structure to increase stored energy of said power storage device when it is determined necessary to perform said charge level increasing control.

12. The control method for the hybrid vehicle according to claim 7, further comprising the step of determining a ratio of output powers of said internal combustion engine and said motor in said total required power, wherein
when an operation point of said internal combustion engine in accordance with the ratio of powers determined is included in said second operation region, the step of determining the output power of said internal combustion engine decreases the output power of said internal combustion engine so as to change the operation point of said internal combustion engine to fall within said first operation region, and
the step of determining the ratio of output powers modifies the ratio of powers so as to increase the output power of said motor in a reflection of the decrease of the output power of said internal combustion engine for the change of said operation point.

* * * * *